United States Patent [19]

Buchan et al.

[11] Patent Number: 4,882,763

[45] Date of Patent: Nov. 21, 1989

[54] METHOD OF MAKING A ROCK-PORE MICROMODEL INVOLVING GENERATION OF AN ACCURATE AND RELIABLE TEMPLATE IMAGE OF AN ACTUAL RESERVOIR ROCK PORE SYSTEM

[75] Inventors: Stuart H. Buchan, Mill Valley, Calif.; Robert Ehrlich, Columbia, S.C.; Joyce C. Trygstad, Walnut Creek, Calif.; Norman C. Wardlaw, Calgary, Canada

[73] Assignee: The Standard Oil Company, Cleveland, Ohio

[21] Appl. No.: 38,295

[22] Filed: Apr. 14, 1987

Related U.S. Application Data

[63] Continuation of Ser. No. 688,034, Dec. 31, 1984, abandoned.

[51] Int. Cl.$^4$ ............................................. G06K 9/00
[52] U.S. Cl. ...................................... 382/1; 280/253; 364/420; 382/54
[58] Field of Search ....................... 382/1, 6, 9, 28, 54; 364/421, 422, 420; 73/38; 250/253, 258

[56] References Cited

U.S. PATENT DOCUMENTS

| | | | |
|---|---|---|---|
| 3,745,527 | 7/1973 | Yoshimura et al. | 382/1 |
| 3,805,035 | 4/1974 | Serra | 382/28 |
| 4,146,788 | 3/1979 | Mirkin et al. | 250/253 |
| 4,562,593 | 12/1985 | Ooe et al. | 382/6 |
| 4,598,419 | 7/1986 | Mignot et al. | 382/6 |
| 4,628,468 | 12/1986 | Thompson et al. | 364/422 |

FOREIGN PATENT DOCUMENTS 2104759  3/1983  United Kingdom.

OTHER PUBLICATIONS

McKellar et al., "A method of Making 2-Dim, Glass Micromodels of Pore Systems", Journal of Canadian Petroleum Technology, vol. 21, No. 4, Jul.-Aug. 1982.
Wardlaw et al., "The Effects of Geometry, Wettability, Viscosity and Interfecial Tension on Trapping in Single Pore Trout Pairs", Jour. of Can. Petroleum Tech., vol. 21, 1982.
Wardlaw et al., "The Effects of Pore Structures on Displacement Efficiency in Reservoir Rocks and in Glass Micromodels", Society of Petroleum Eng. of AIME, Apr. 1980.
Peden et al., "Visual Investigation of Multiphase Flow and Phase Interactions within Porous Media", Society of Petroleum Eng., Sep. 1985.
Peden et al., "Visual Studies in Reservoir Engineering", Third European Meeting on Improved Oil Recovery, Rome, Apr., 1985.
Chatis, et al., "Magnitude and Detailed Structure of Residual oil Saturation", Society of Petroleum Engineers of AIME Apr. 1983, pp. 311-326.
Crabtree, "Algorithmic Development of a Petro Graphic Image Analysis System", Department of Geology, University of So. Carolina, 1983.
Crabtree et al., "Evalulating of Strategies for Segmentation of Blue-Dye Pores in Thin Sections of Reservoir Rocks", Computer Vision, Graphics, and Image Processing, 28, 1-18, 1984.

*Primary Examiner*—Leo H. Boudreau
*Attorney, Agent, or Firm*—Larry W. Evans; David J. Untener; Raymond F. Keller

[57] ABSTRACT

A method of making a glass micromodel of a pore system found in petroleum reservoir rock wherein a computer-generated two-dimensional binary image of the actual rock pore system taken in thin section is used to produce a template for etched reproduction of the pore system in the glass model plate of the micromodel. The template is produced by digitizing a video image of a view of the rock in thin section, which thin section includes injected dyed material to make the pore system visible, processing the digitized video image through a digital filter so as to effect projection of the three-dimensional aspects of the pore connectedness and geometry viewed through overlaying meineral onto the plane of the imaged view to obtain a two-dimensional template image of the three-dimensional pore system with pores accurately coordinated and pore geometry relationships reliably preserved.

13 Claims, 4 Drawing Sheets

METHOD OF MAKING A ROCK-PORE MICROMODEL INVOLVING GENERATION OF AN ACCURATE AND RELIABLE TEMPLATE IMAGE OF AN ACTUAL RESERVOIR ROCK PORE SYSTEM

This is a continuation of application Ser. No. 688,034, filed Dec. 31, 1984, now abandoned.

DISCLOSURE

The invention herein disclosed relates generally to petrology and more particularly to a procedure for making glass micromodels of pore systems found in petroleum reservoir rock. The procedure involves generation of a two-dimensional template image of a three-dimensional pore system wherein pores are accurately connected and pore geometry relationships preserved for subsequent use and/or analysis. Pore systems or networks found in petroleum reservoir rock are made up of relatively larger voids or spaces, referred to as pores, which are connected by relatively smaller voids or spaces, referred to as pore throats.

BACKGROUND

There is a continuing need to develop improved methods for predicting fluid flow characteristics of petroleum reservoir rock. The predictions are particularly important when evaluating hydrocarbon distribution and when evaluating enhanced recovery techniques such as water flood, water flood followed by miscible flood, and miscible flood.

Towards relating the petrology of reservoirs (pore geometry, surface areas of mineral phases and pores, pore throat size frequency distributions, etc.) to geophysical and petrophysical data, Dr. R. Ehrlich at the University of South Carolina developed a procedure known as Petrographic Image Analysis (PIA) to generate high quality quantitative data from thin sections or slices of reservoir rock. PIA is utilized to link reservoir characteristics as viewed in section to petrophysical measurements obtained down-hole or from core samples, it being presumed that a relationship exists between essentially two-dimensional views and the three-dimensional character of the pore system or complex.

PIA relies on computer-based image analysis using pattern recognition/classification programs. The images are acquired by digitizing, for example, the analog output signal of a video scanner attached to an optical microscope. In a manner analogous to remote sensing, the analog signal (representing a time varying voltage proportional to scene brightness as the raster scans the image) is "digitized" by sampling intensities only at some integral time increment resulting in a grid of points or picture elements called pixels. Pores at least as small as 0.3 microns can be detected.

In the image acquisition procedure, the voids, i.e., pore system, in a thin slice or section of the reservoir rock are filled, as by injection, with a blue-dyed epoxy. Accordingly, the cross-section to be imaged consists of the undyed mineral matter and the blue-dyed voids. A digital filter is employed to distinguish the pores (blue) from the surrounding rock formation (not blue) for image segmentation. By distinguishing the pores from the rock matrix in this manner, a binary image of the two-dimensional or planar surface of the thin section may be obtained wherein all pixels corresponding to pores are set to black (binary one, for example) while all others are set to white (binary zero). Binary images of this type have been utilized for subsequent analysis of pore geometry, pore throat size frequency distributions, etc. It is noted, however, that the imaged pores at the planar surface of the thin section are largely uncoordinated. That is, the imaged pores are mostly not connected to one another whereas in the three dimensional pore network narrow connections termed pore throats do connect the pores to one another. In binary images of the above noted type, the only imaged pore throats are the relatively few that exist at the surface of the thin section. Also relatively large pores may appear as two disconnected pores if a medial portion thereof is overlain by mineral at the surface of the thin section.

It is noted that most minerals in typical petroleum reservoir rock, e.g., sandstone, are translucent to transparent. Consequently, blue-eyed epoxy filled voids beneath the surface of the thin section can be viewed through the overlying mineral matter. Thus it has been possible to define pore overlain by mineral matter (and also pore underlain by mineral matter) by use of a digital filter as a function of hue, saturation and intensity of the blue-dyed epoxy filling the pores in the three-dimensional thin section. Other more complex digital filters may be used, for example, to distinguish clay from pore even if the clay is blue tinged or to distinguish carbonate textural types or detrital minerals by using gray-level segmentation.

A more complete and detailed disclosure of the foregoing imaging and digital filtering techniques and related analysis can be found in the 1983 Ph.D. Dissertation of Sterling James Crabtree, "Algorithmic Development of a Petrographic Image Analysis System", Department of Geology, University of South Carolina, Columbia, S.C.; and in Crabtree, Ehrlich and Prince, "Evaluation of Strategies for Segmentation of Blue-dyed Pores in Thin Sections of Reservoir Rocks" *Computer Vision, Graphics, and Image Processing* 28, 1–18 (1984).

In contrast to computer-based image analysis, analytical procedures have been developed wherein physical tests such as fluid displacement tests are performed on actual reservoir core samples. These tests, however, require a relatively large sample size and substantial time and money to complete. As an alternative, fluid flow displacement tests have been performed with artificially designed pore system configurations or standard materials such as homogeneous Berea sandstone, neither of which can reliably represent the specific pore structure of a complex reservoir having unique characteristcs. Consequently, many prior fluid flow models were of minimal predictive value because of errors and/or limitations inherent in the modeling processes utilized.

Disclosures of fluid displacement tests using micromodels and rock fluid transport theories can be found in Larsen, Scrivan and Davis, 1977, Percolation Theory of Residual Phases in Porous Media: Nature, Vol. 268, pp. 409–413; McKellar and Wardlaw, 1982, A Method of Making Two-Dimensional Glass Micromodels of Pore Systems: tech. note, Journal Canadian Petr. Tech., Vol. 21, No. 4; Morrow and Chatzie, 1981, Measurement and Correlation of Conditions for Entrapment and Mobilization of Residual Oil—Final Report: DOE/BETC/3251-12, U.S. Dept. Energy. October 1981, New Mexico Petroleum Recovery Research Center, New Mexico Inst. Mining and Technology, Socorro, N. Mex.; and Pathak, Winterfield, et al, 1980, Rock Structure and Transport Therein: Unifying with Voroni Models and Percolation Concepts: SPE 8846, First Joint SPE/DOE Symposium Enhanced Oil Recovery, Tulsa.

In the above referenced McKellar and Wardlaw paper, several methods of making micromodels are briefly discussed along with a detailed description of a technique developed by the authors. This latter technique uses photo-imaging of a synthesized or hand drafted pore system followed by chemical etching of the image in glass. The glass micromodel (termed a "two-dimensional" glass micromodel because the two-dimensional image of the synthesized pore system is carried into the third dimension by the etching process) is then used in a laboratory setting as a substitute rock-pore complex for viewing and evaluation of fluid movement. Quantitative results are typically reported using mass balance or chromatography procedures, but the results are presented strictly in terms of the micromodel itself which heretofore could not be reliably related independently of the skill of the model maker to actual and specific rock-pore systems that exist in nature.

SUMMARY OF THE INVENTION

The present invention provides an innovative procedure that uses a computer generated binary image of an actual rock pore system as a template in the making of a glass micromodel. The invention, more particularly, provides a modeling procedure involving a unique integration of the above noted computer-based pore imaging and segmenting techniques with the above noted photo-imaging technique in the making of a glass micromodel that represents the actual three dimensional pore network of reservoir rock more precisely and reliably than glass micromodels made in accordance with prior modeling techniques. Unlike prior modeling techniques involving simulated pore patterns involving artificially designed or hand drafted shapes and arrangements, the procedure disclosed herein provides a channeling network in a micrromodel wherein pores are accurately connected and pore geometry relationships reliably preserved in relation to the actual pore system in the rock being examined. The invention involves the generation of an accurate and reliable two-dimensional template image of an actual rock pore system viewed in thin section in which the three-dimensional connectedness of the pore system is projected or superimposed onto the surface image of the pore system.

According to one aspect of the invention, a method of making a micromodel of a rock pore system comprises the step of using a computer generated two-dimensional binary image of the actual rock pore system taken in cross-section to produce an etched pattern of the pore system in a substrate. The etched substrate, especially a glass model plate, subsequently may be assembled into a micromodel for use in the performance of fluid flow displacement tests, for example.

According to another aspect of the invention, a method of making a micromodel of a pore system in a rock having a substantially translucent to transport rock framework, comprises the steps of:

(a) producing a digitized video image of a view of the rock in section, which section includes injected dyed material to make the pore system visible;

(b) processing the digitized video image to obtain a two-dimensional binary template image wherein the image elements, such as pixels, representing both the pores and connections exposed to the surface of the section and the extensions thereof and connections therebetween beneath the surface of the section are set opposite all other image elements; and (c) using the template image to etch the pattern thereof into a substrate.

According to still another aspect of the invention, a method of making a micromodel of a pore system in a rock having a substantially translucent to transport rock framework comprises the steps of:

(a) injecting a dyed material into a porous rock specimen so as to distinguish the pores and pore connections from the surrounding rock framework;

(b) scanning a view of the prepared rock specimen in section, especially in thin section, to produce a digital image thereof;

(c) processing the digital image, as by using a digital filter, so as to effect projection of the three-dimensional aspects of the pore connectedness and geometry onto the plane of the imaged view to obtain a two-dimensional template of the three-dimensional pore system with pore geometry relationships preserved and pores accurately connected; and (d) using the template image to etch the patternn thereof into a substrate.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DISCLOSURE

The present invention, as above indicated, is directed to a method of making a "two-dimensional" glass micromodel of a reservoir rock pore system. An exemplary micromodel can be seen in FIG. 1 of the drawings to include a glass model plate 10 having a rock pore system pattern etched in a planar surface thereof and a plain glass cover plate 11. The model and cover plates may be fused together but preferably the plates are clamped together in the manner illustrated to permit separation of the plates as for thorough cleaning of the pore surfaces as between fluid displacement tests. The model and cover plates 10 and 11 may be sandwiched between thick glass plates, one being seen at 13, and the clamping devices 14 are positioned so as not to obstruct the view of the pore system pattern etched in the model plate.

Figure 2:
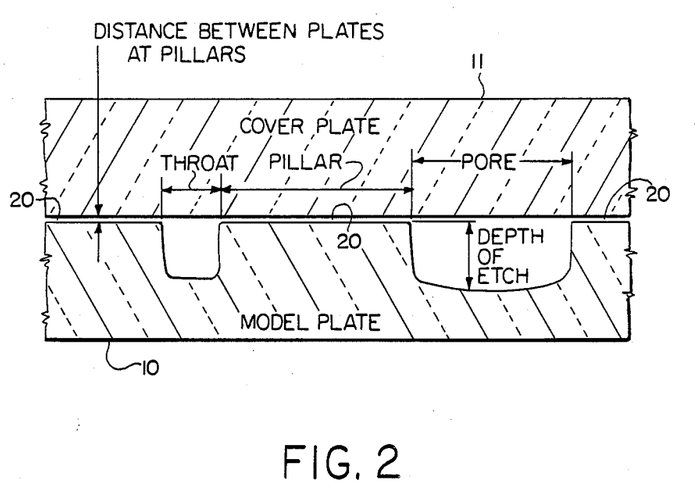
FIG. 2 is an enlarged fragmentary cross-sectional view through the clamped model and cover plates of the micromodel of FIG. 1.

By clamping rather than fusing the model and cover plates 10 and 11, a small separation, as on the order of about 15 microns, may be provided between the plates where the surface of the model plate is not etched. These spaces, seen at 20 in FIG. 2, are referred to as pillar spaces. The pillar spaces provide secondary connections between the pores and throats at the surface of the model plate and give a three-dimensional aspect to the model which is believed to increase the similarity between the modeled pore system and the actual three-dimensional rock pore system being studied. The pillar spaces in effect increase the coordination number of the modeled rock pore system. The pillar spaces may also be likened to the thin planar spaces (lamellar pores) which are common at crystal and particle boundaries in reservoir rocks. Generally the thickness of the pillar spaces is dependent on the flatness of the glass plates and the clamping system and forces employed to hold the plates together. The pillar spaces may be eliminated if desired but this may present a problem in separating the plates.

Figure 1:
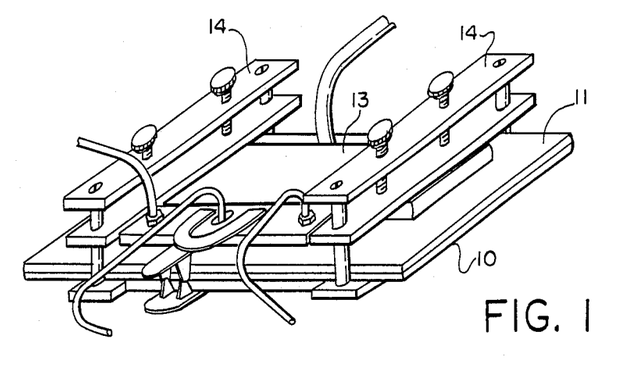
FIG. 1 is a perspective view of a glass micromodel.

In accordance with a preferred method of making a "two-dimensional" glass micromodel and particularly the etched model plate 10, a sample of the reservoir rock to be studied is injected with a dyed material, e.g., epoxy or glue, so as to fill the voids (pores and pore throats) in the rock framework or matrix. The dyed material may be blue-dyed epoxy which hardens to fix the same in the rock framework. This void filling enables the pore system to be optically distinguished (in three dimensions as discussed below) from the surrounding rock framework. It is noted that blue dye is preferred because there are few, if any, naturally occurring blue constituents within most reservoir rocks. However, other materials may be used to distinguish optically the three dimensional pore system from the rock framework when viewed in thin section as discussed below.

A translucent thin section then is obtained fromm the injected sample as by grinding the sample until the thin section transmits light therethrough. Although a thickness on the order of 30 microns is typical, the thin section can be much thicker or even thinner than the standard (30 microns) thickness.

The prepared thin section (preferably glued to a glass slide) is then placed on the stage of an optical transmitted-light microscope to which a black and white video scanner (camera) is optically coupled. The video scanner generates a time varying voltage proportional to scene brightness as the raster scans the magnified view of the thin section. In conventional manner, the analog voltage output of the video scanner is "digitized" as in a videodigitizer by sampling intensities only at a given time increment so as to generate a grid of picture elements (pixels) that is stored by a digital computer in memory. Each grid point or pixel may be defined by three values: two spatial coordinates (X,Y) and an intensity (brightness) value. For reasons discussed below, red, green and/or blue optical filters may be interposed, as between the thin section and the transmitted light source, and the resultant signals each "digitized" to produce respective memory images (color planes). Preferably, the video scanner has high resolution such as on the order of a 512 by 480 pixel array, and the associated "digitizing" circuitry has an equivalent or greater amount of storage.

A segmentation technique is then utilized to distinguish pore (and pore throats) from nonpore (mineral) pixels to produce a binary computer image of the rock pore system wherein all pixels representing pore or pore throats are set to black (binary one) and all others are set to white (binary zero). The preferred segmentation technique, according to the invention, uses a digital filter which is a set of mathematical relationships of the gray level intensitie of a scene digitized through respective color filters (color planes). The digital filter determines cut-off points with reference to a ratio of the intensities of corresponding pixels in the digitized images and thus, for example, assigns "one" to those pixels with the correct value for pore and "zero" to all other pixels, thereby to produce a binary image.

For details respecting rock pore imaging and segmentation using digital filtering techniques, reference may be had to the above noted Ph.D. Dissertation of Sterling J. Crabtree; and to Crabtree, Ehrlich and Prince, "Evaluation of Strategies for Segmentation of Blue Dyed Pores in Thin Sections of Reservoir Rocks" *Computer Vision, Graphics, and Image Processing* 28, 1–18 (1984), both such papers being hereby incorporated herein by reference.

Figure 3:
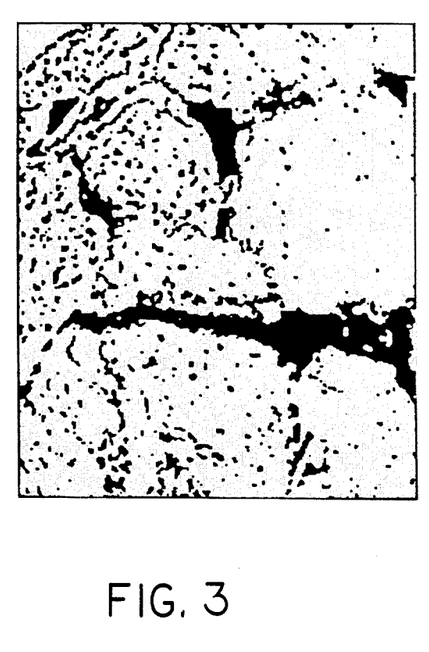
FIG. 3 is a prior art binary image of a thin section of sandstone.

As discussed in these papers, a ditigal filter may be set so that only pores (and pore throats) at the surface of the thin section are imaged. It is noted that in the resultant binary image, the pores would be substantially unconnected while, in fact, pores at the surface of the thin section will be connected by pore throats and pore extensions beneath the surface of the thin section. That is, only a small percentage of the pore throats that connect one pore to another will be at the surface of the thin section from which the images are obtained. The unconnectedness of the pores can be seen in FIG. 3 which is a reproduction of a binary image of the surface of a thin section of sandstone. Pore images of this type have previously been utilized for subsequent analysis of pore geometry, pore throat size frequency distributions, etc., as is discussed in the above referenced Ph.D. Dissertation of Sterling J. Crabtree.

As indicated above, most minerals in typical reservoir rock, e.g., sandstone and limestone, are translucent to transparent. Consequently, connections between pores and three-dimensional characteristics of the pores can be viewed through the overlying mineral matter. Thus it has been possible as by use of a digital filter, to define pore overlain by mineral matter, pore underlain by mineral matter, and pore not overlain or underlain by mineral matter as a function of hue, saturation, and intensity of the blue-dyed epoxy filling the pores when viewed in thin section. It was mentioned in the above noted Ph.D. Dissertation that this ability to define overlain and underlain pore can help in defining the pore network in the third dimension.

In contrast to prior uses of computer developed binary images for subsequent computerized analysis of a reservoir rock pore system, the subject invention provides for the use of a binary image of an actual rock pore system as a template in the making of a glass micromodel as hereinafter discussed. Further in accordance with the preferred method of the invention, a digital filter, as of the type above referenced, in configured to project the three-dimensional connectedness of the actual rock pore system onto the plane of the two-dimensional image of the surface of the thin section to obtain a template image wherein the pores are accurately interconnected and pore geometry relationships, such as pore to throat size ratios and pore roughness and tortusoity, are reliably maintained. Alternatively, individually generated binary images of the blue-dyed epoxy filled voids in the thin section respectively overlain by mineral, underlain by mineral, and not overlain or underlain by mineral (or any two thereof generated independently of the third) may be, according to the invention, superimposed one upon the other to obtain a composite binary image suitable for use as a template image in the making of the glass micromodel. Respecting any of these procedures, it is noted that the resultant binary "expanded view" or template image will have a considerably higher degree of pore coordination than an image taken from the surface of the thin section alone, and there also will be an increase in overall porosity but this is not considered very important to the micromodel subsequently formed as in the below-discussed preferred manner.

According to the invention, it is generally sufficient that the digital filter, in the case of a thin rock section prepared with blue-dyed epoxy as above described, be a set of mathematical relationships of the gray level intensities of a scene digitized through a red gel filter and a blue gel filter, respectively. When imaged through the red filter, pixels corresponding to blue pore (appearing very dark) would be of very low intensity because the red filter does not pass much blue light. On the other hand, pixels corresponding to blue pore (appearing very bright) would be of very high intensity when imaged through the blue filter. The digital filter compares the absolute intensity of each pixel in the red and blue filtered images as well as the difference in the intensities. It is noted that the digitized images (color planes) are obtained with a black and white camera and stored in computer memory for processing by the digital filter. It further is noted that this digital filtering technique generally follows the blue-red thresholding and ratio segmentation technique discussed in the above noted Crabtree, Erhlich and Prince article, excep that, to determine the location and size of pore connections in three dimensions, the digital filter preferably is simply configured by setting the intensity relationships such that all blue color, whatever the shade (degree of saturation), is registered as "pore" whether it be exposed at the surface of the thin section or arises from beneath mineral. That is, the color blue is the primary criteria for indentifying pore. In this manner, the digital filter will define in three dimensions the "pore" pixels of the two-dimensional template image. By using a suitably thick thin section of the particular rock specimen (as discussed above), the pore template image will be essentially completely and accurately coordinated in relation to the actual rock specimen.

It also is noted that a template image suitable for use in making a micromodel according to the invention may be obtained by using a segmentation technique based on hue, saturation and intensity, such technique being discussed in the above-noted Ph.D. Dissertation and the Crabtree, Ehrlich and Prince article. Such procedure is followed to the extent that all pixels that are defined by the hue algorithm as being located between 180° and 300° and therefore contain the color blue as isolated, and then the blue pixels that are below 7% intensity and above 75% intensity are eliminated as representative of the colors black and white, respectively. The blue pixels which survive the intensity sort are then defined as pore pixels in the template image. It is noted that such pore pixels in the template image accordingly will correspond to pores and pore throats whether overlain, underlain, or not overlain or underlain by mineral.

As will be appreciated, a thin section (generally one which transmits light therethrough as above-discussed) will not be needed if, for example, a fluorescent blue epoxy material or the like is used for distinguish pore from mineral in the rock speciment. The rock specimen then need only be viewed in cross-section for generation of the digitized video images with the injected fluorescent material emitting the necessary light for imaging and segmentation in the above discussed manner.

The computer generated binary "expanded" image, i.e., the template image resulting from the foregoing imaging and segmentation procedures, then may be reproduced on paper as by using a computer graphics plotter. Any apparently missing pore throats may then be drawn in by hand on the paper template.

For purposes of obtaining a desired micromodel size, multiple paper reproduction of the template may be assembled as a mosaic to form a composite reproduction with pore connections between the individual images drawn in by hand. A typical field of view of the optical microscope and hence the resultant binary image of such view may contain, say, 30–50 pores whereas the micromodel, to obtain satisfactory results, may require, for example, approximately 3000 coordinated pores. Accordingly, the mosaic may consist of 60 or so views. The mosaic may be formed by multiples of the same template or by templates representing respective different thin sections to obtain an averaged composite template of a group of thin sections taken, for example, from the same core sample. Another approach would be to assemble multiple replicas of respective different view as strata in the composite, e.g., in descending rows with each row being formed from replicas of the same view. Each row of views may correspond to respective thin sections taken at different depths in a petroleum reservoir more to closely model actual reservoir characteristics.

By way of specific example, the plot of each field of view generated by a computer graphics plotter may be a rectangle of about 24.0 cm by 18.5 cm which represents approximately 1.1 microns by 0.87 microns in the thin section. The individual images may then be reduced to about 4.8 cm by 3.7 cm and joined by matching parts of similar looking images with the completed mosaic measuring about 40.0 cm. by 34.0 cm. The mosaic may then be photo-reduced to about 8.5 cm by 7.2 cm which is a satisfactory size for a micromodel having about the same scale as the rock being replicated.

Figure 4:
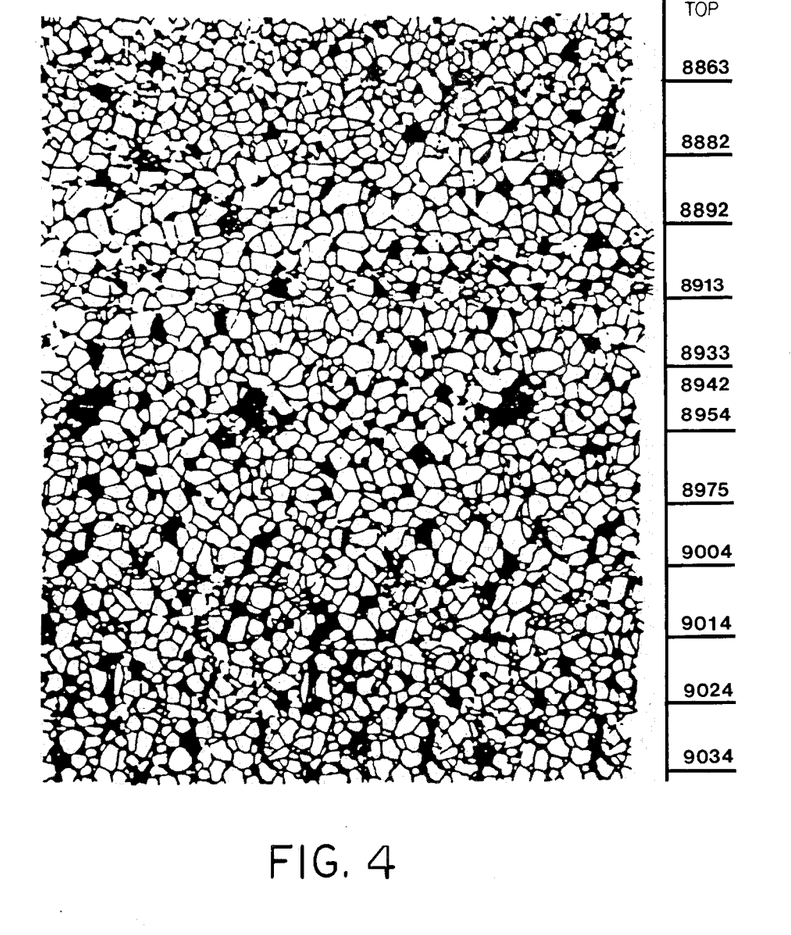
FIG. 4 is an exemplary composite template according to the invention from which a glass micromodel may be fabricated.

An exemplary composite template is shown in FIG. 4. (The numbers at the right in FIG. 4 are the depths in the reservoir of the rock core samples from which the views in corresponding rows were taken.) At this point in the overall method according to the invention, there is provided an intermediate product (template) wherein three dimensional characteristics of the pore system are included in the two-dimensional template image so that pore connectedness is complete and accurate with pore geometry relationships being reliably maintained. The resulting template thusly accurately and reliably represents the actual pore complex of the rock specimen being modeled. It also is noted that the above mentioned construction of the mosaic with stratigraphic order preserved will provide the laminated aspect actually present within the reservoir rock as well as a means of evaluating an entire startigraphic sequence within a single micromodel.

The photographic template image may be further reduced (or enlarged) as needed and a positive black and white transparency made thereof. On the positive transparency the pore system pattern may be black or opaque to ultraviolet light, and the rock framework pattern may be transparent to ultraviolet light. The positive transparency may now be used for etching by suitable means the model plate of the glass micromodel preferably as follows.

Chemical etching may be used whereby a piece of glass is prepared by copper coating one face thereof and cutting the plate to the desired size of the micromodel. The coppered surface of the glass may then be coated with a photoresist and then the positive transparency placed thereover. A clean glass plate may be placed on the positive transparency to hold the same flat and in place and then the assemblage is exposed to ultraviolet light. In this manner, only those areas of the resist coating corresponding to the rock framework pattern in the black and white transparency are exposed to ultraviolet light.

The exposed glass plate is then set in developer and then washed to remove developer and unexposed photoresist. Removal of the unexposed photoresist leaves copper visible in the pattern of the pore system. On the other hand, photoresist remains in those areas corresponding to the rock framework pattern.

Figure 5:
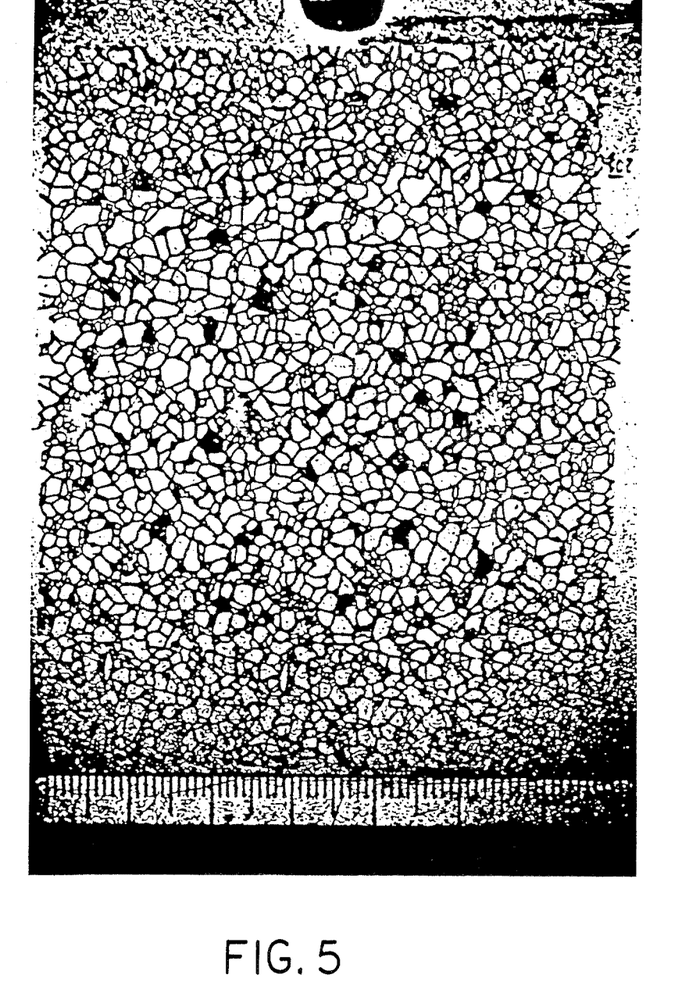
FIG. 5 is a reproduction of a photograph of the etched surface of a model plate etched using the template of FIG. 4.

The glass plate is then placed in nitric acid solution to remove the visible copper thereby exposing glass in the pattern of the pore system. Unexposed photoresist protects underlying copper from the nitric acid. After exposed areas on the glass that are not to be etched, e.g., the plate edges, are covered with paraffin, the model is placed in hydrofluoric acid solution to etch the pore system pattern into the glass surface. The resultant model plate is then cleaned of wax, copper and remaining photoresist as with benzene, nitric acid, acetone and water, respectively. In FIG. 5, the etched surface of an exemplary model plate is shown. The average depth of etched pores may be about 180 microns and minimum pore throat diameter may be about 18 microns since smaller pore throats are difficult to etch.

For further details of a procedure for making a model plate, particularly from a piece of ordinary mirror, by use of a photo-imaging technique followed by chemical etching of the mirror glass, reference may be had to Wardlaw and McKeller, 1982, A Method of Making Two-Dimensional Glass Micromodels of Pore Systems: tech, note, Journal of Canadian Petroleum Technology, Vol. 21, No. 4, which is hereby incorporated herein by reference.

It will be appreciated that at this point in the modeling procedure according to the invention, the model plate will have the template pattern of the pore system etched into one surface with the surrounding rock framework being represented by the unetched part of that surface. Accordingly, the model plate has etched therein a rock-pore pattern of the actual reservoir rock being studied wherein pore coordination and pore geometry relationships are reliably related to the actual reservoir rock. It is noted that because of side erosion during chemical etching, the diameters of pores and pore throats in the etched model plate may be several microns larger than the corresponding pores and pore throats in the template. Also, the percentage increase in pore and pore throat diameter will of course progressively increase as diameter decreases. Hence a pore throat of 5 microns in the template may grow to about 20 microns for a threefold increase whereas large pores will have a much smaller percentage increase. In any event, the method of the invention is a marked departure from and provides a more reliably related micromodel than prior techniques wherein the pore networks etched into the model plates have been artificial or hand drafted designs.

Other techniques may be used to make the model plate including laser engraving techniques not subject to the above-noted chemical etching error. The template pattern (or image) may be laser engraved into a suitable substrate such as smooth metal plate and then a glass or other transparent cover plate placed over the engraved metal plate. Deposition and plating techniques also are contemplated and, unless otherwise indicated, "etching" herein is intended to include etching, engraving and other techniques that can be used to form a channeling network in a micromodel that corresponds to the template pattern or image.

The etched model plate 10 may now be assembled with a cover plate 11 in the aforedescribed manner and fluid flow tests performed on the micromodel as in conventional manner. Fluid flow tests are well known to the art and need not be herein described inasmuch as they form no part of the subject invention except to the extent they give rise to one specific usage of a micromodel produced in accordance with the invention. It is noted, however, that the results of the tests will now be based on real reservoir rock-pore systems rather than on artificially designed or hand drawn pore system configurations.

A micromodel, made in accordance with the invention and representing typical characteristics of a selected reservoir rock, may have the following approximate properties:

| Interparticle Pores | |
|---|---|
| Mean Diameter | 0.9 mm. |
| Minimum Diameter | 183 microns |
| Maximum Diameter | 5.3 mm. |
| Pore Vloume | 40% |
| Intraparticle Microporosity | |
| Mean Diameter | 175 microns |
| Minimum Diameter | 70 microns |
| Maximum Diameter | 550 microns |
| Pore Volume | 20% |
| No. of Clusters | 55 |
| Throats Connecting Interparticle Pores | |
| Mean Diameter | 180 microns |
| Minimum Diameter | 18 microns |
| Maximum Diameter | 384 microns |
| Pore Volume | 40% |
| Average Pore to Throat Size Ratio (Ratio of mean diameters of interparticle pores and connecting throats measured in the plane of the model) | 5:1 |
| Coordination No. (Average number of throats connecting each pore) | 5.5 (2–17) |
| Average Depth of Etch of Interparticle Pores | 180 microns |
| Average Depth of Etch of Intraparticle Pores | 180 microns |
| Area of Pillars | 65% of total model area |
| Average Distance Between Plates | 15 microns |
| Volume over Pillars | 0.056 cc. |
| Volume of Pores (excluding volume of pillars) | 0.204 cc. |

The invention also encompasses a modified, but less preferred, procedure involving the use of a binary computer image of a rock specimen wherein only pores and pore connections at the surface of the specimen are imaged and represented as black (or the equivalent) with the remainder of the image represented as white (or the equivalent). As discussed above, a binary pore image of this type can be produced by using computer-based imaging techniques, but as also noted above, the pores would be substantially unconnected. In accordance with this modified procedure, a preliminary template of such binary image is made and then the missing pore connections are drawn in by hand, as where pores most likely would connect, preferably with the aid of visual inspection of the thin section under the microscope, to approximate the pore connectedness that actually exists in the three-dimensional pore network. Reliance also may be had on the observation that small cusps on the periphery of each core generally mark the location where pore throats enter a pore; accordingly, lines representing pore throats can be drawn from pore to pore connecting adjacent cusps with the line width preferably based on visual inspection of the thin section, but no smaller than that which could be successfully transferred to the glass micromodel while at the same time possessing a reasonable ratio between throat width and pore width. As previously indicated, a typical minimum throat diameter in a micromodel is about 18 microns and a typical pore to throat size ratio is about 5:1. The approximated template then is used to make the model plate as in the aforedescribed manner.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the following claims.

What is claimed is:

1. A method of making a micromodel of a rock pore system comprising:
    transmitting light through a thin section of a rock containing a pore system, said thin section having a dyes material disposed in said pore system to enhance the visibility of the pore system;
    projecting the transmitted light onto a surface to form a two-dimensional image of the pore system including representations of the three-dimensional pore connectedness and geometry within said section;
    digitizing the projected two-dimensional image to produce a two-dimensional binary template image of the pore system; and
    etching said binary template imge into a substrate, whereby a micromodel of said pore system including its three-dimensional aspects is produced.

2. A method as set forth in claim 1, wheresin said projecting step includes using the color characteristics of the transmitted light as the primary criteria for distinguishing pore from non-pore within said section and forming a representation of at least one pore within said section in said two-dimensional video image.

3. A method as set forth in claim 1, including injecting said dyed material into a porous rock specimen, using a video-scanner to scan a view of said thin section of the rock specimen through an optical transmitted-light microscope, and using a video-digitizer to produce said binary template image containing a plurality of pixels, each pixel being defined by two spatial coordinates and an intensity level.

4. A method as set forth in claim 3, including producing plural digitized video images using respective different optical color filters to obtain respective color plane images, and said projecting step includes using a digital filter to assign, as a function of hue, saturation and intensity, a value to all pixels representing pore and pore connections in said section and a different value to all other pixels.

5. A method as set forth in claim 1, further comprising assembling a mosaic of plural binary template images to obtain a composite template image.

6. A method as set forth in claim 5, wherein said assembling step includes reproducing the plural binary template images on paper or the like, assembling the paper reproductions into the mosaic, and then drawing in pore connections between adjacent boundaries of the paper reproductions.

7. A method as set forth in claim 1, including making a photographic transparency of the binary template image and then using the transparency to etch chemically the pattern of the pore system in the substrate.

8. A method of making a micromodel of a rock pore system comprising:
    injecting dyed material into a porous rock specimen for optically distinguishing the pores and pore connections in said specimen from the surrounding rock;
    preparing a thin section of the rock specimen containing the dyed material;
    transmitting light through said thin section;
    projecting the transmitted light onto a surface to form a two-dimensional image of the pore system including representations of the three-dimensional pore connectedness and geometry within said section;
    digitizing the projected two-dimensional image to produce a two-dimensional binary template image of the pore system; and
    etching said binary template image into a substrate, whereby a micro-model of said pore system including its three-dimensional aspects is produced.

9. A method as set forth in claim 8, further comprising assembling a mosaic of plural template to obtain a composite image.

10. A method as set forth in claim 9, wherein said assembling step includes reproducing the plural template images on paper or the like, assembling the paper reproductions into the mosaic, and then drawing in pore connections between adjacent boundaries of the paper reproductions.

11. A method as set forth in claim 9, including making a photographic transparency of the mosaic and then using the transparency to etch chemically the pattern of the pore system in the substrate.

12. A method as set forth in claim 8, wherein the substrate is a glass plate, and further comprising assembling the etched glass plate in a glass micromodel.

13. A micromodel made in accordance with the method of claim 8.

* * * * *

UNITED STATES PATENT AND TRADEMARK OFFICE
CERTIFICATE OF CORRECTION

PATENT NO. : 4,882,763
DATED : November 21, 1989
INVENTOR(S) : Stuart H. Buchan et al.

It is certified that error appears in the above-identified patent and that said Letters Patent is hereby corrected as shown below:

```
COLUMN 11:
Claim 1, line 5, replace "dyes" with --dyed--; line 13,
after "system" insert --including the representations of
the three-dimensional pore connectedness and geometry--;
line 14, replace "imge" with --image--.
COLUMN 11:
Claim 2, line 1, replace "wheresin" with --wherein--.
COLUMN 12:
Claim 7, line 3, replace "transparcency" with --transparency
COLUMN 12:
Claim 8, line 16, after "system" insert --including the
representations of the three-dimensional pore connectedness
and geometry--; line 18, replace "micro-model" with
--micromodel--.
COLUMN 12:
Claim 9, line 2, after "template" insert --images--.
```

Signed and Sealed this

Twentieth Day of October, 1992

*Attest:*

DOUGLAS B. COMER

*Attesting Officer*      *Acting Commissioner of Patents and Trademarks*